United States Patent [19]

Steinberg

[11] 4,102,402
[45] Jul. 25, 1978

[54] SUBSOILER

[75] Inventor: Richard W. Steinberg, Mankato, Minn.

[73] Assignee: Vibra-King, Inc., Mankato, Minn.

[21] Appl. No.: 722,694

[22] Filed: Sep. 13, 1976

[51] Int. Cl.² ............................................. A01B 11/00
[52] U.S. Cl. ......................................... 172/40; 172/54; 172/68; 172/71; 172/265; 172/699
[58] Field of Search ...................... 172/40, 54, 68, 324, 172/71, 196, 145, 166, 699, 265, 310, 285, 261

[56] References Cited

U.S. PATENT DOCUMENTS

| 3,371,495 | 3/1968 | Kaercher, Jr. | 172/40 X |
|---|---|---|---|
| 3,396,804 | 8/1968 | Rogers | 172/40 |
| 3,559,745 | 2/1971 | Thompson et al. | 172/324 X |
| 3,575,006 | 4/1971 | Rogrodon et al. | 172/40 X |
| 3,647,003 | 3/1972 | Gagne | 172/40 |
| 3,698,484 | 10/1972 | Kinnan | 172/40 |
| 3,746,100 | 7/1973 | Hall et al. | 172/40 |
| 3,967,564 | 7/1976 | Emling | 172/145 X |
| 4,024,921 | 5/1977 | Tibbs | 172/196 X |

FOREIGN PATENT DOCUMENTS

| 926,155 | 5/1973 | Canada | 172/40 |
|---|---|---|---|
| 1,944,657 | 3/1971 | Fed. Rep. of Germany | 172/40 |
| 1,456 of | 1871 | United Kingdom | 172/196 |

Primary Examiner—Paul E. Shapiro
Attorney, Agent, or Firm—Burd, Braddock & Bartz

[57] ABSTRACT

An implement having an elongated tool extendable into the subsoil to break up the hardpan and open the subsoil for moisture and tap roots of plants. The tool has orbital motion generated with power driven eccentric structures coupled to the tool. Power is applied to the eccentric structure with a gear box driven with a hydraulic motor. Flywheels are connected to the eccentric structures and the gear box drive shafts. Links connected to the tool and a frame carry a rolling coulter disc operable to cut a slit in the soil ahead of the tool. A hinge assembly having elastic members mounts the frame on a carriage. In one form, the carriage is pivotally mounted on a draft beam of a moldboard plow and biased to an earthworking position by a hydraulic cylinder. In a second form, the carriage is a plate which forms a part of a hitch assembly for connecting the implement to a three-point hitch of a draft tractor.

49 Claims, 10 Drawing Figures

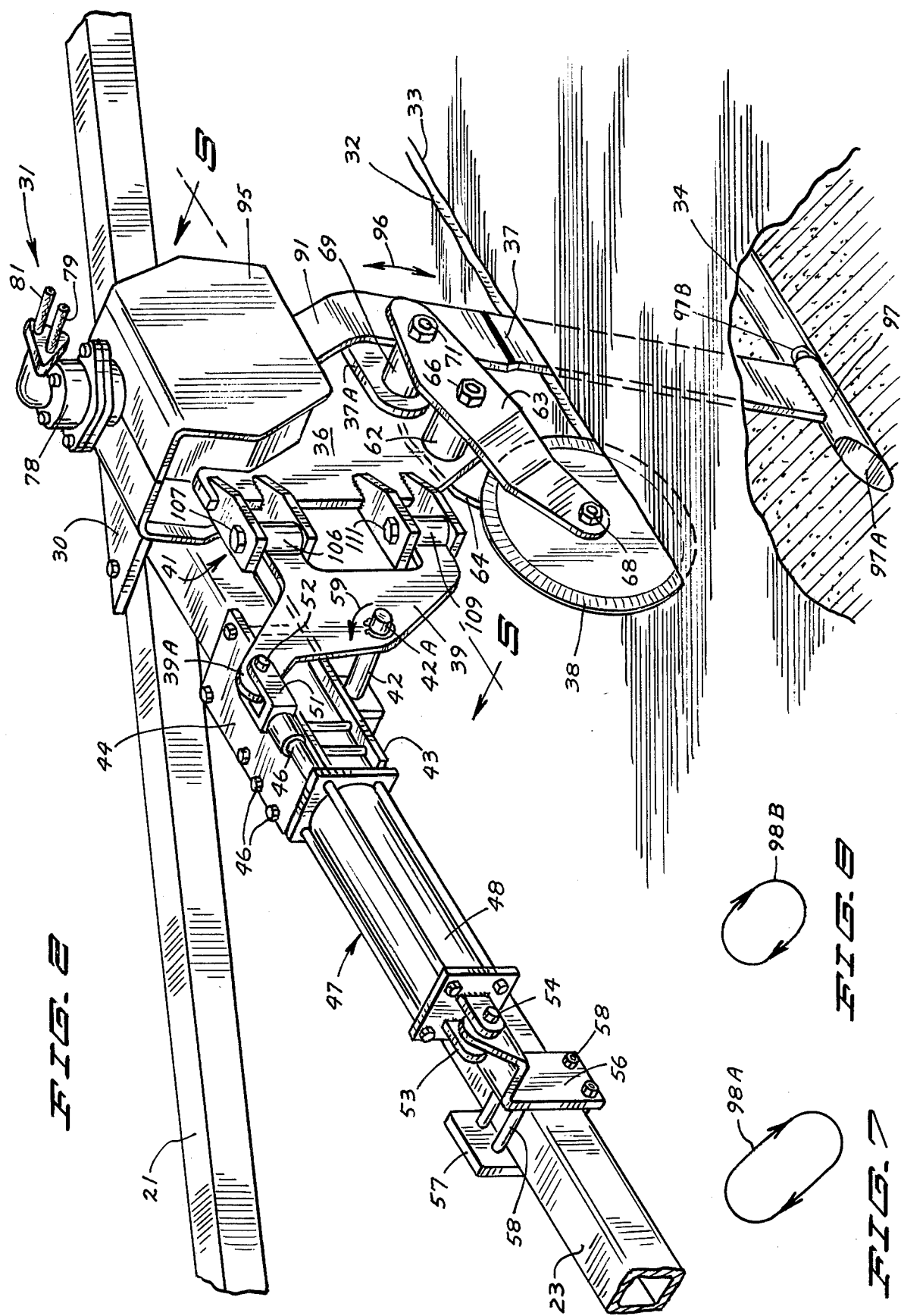

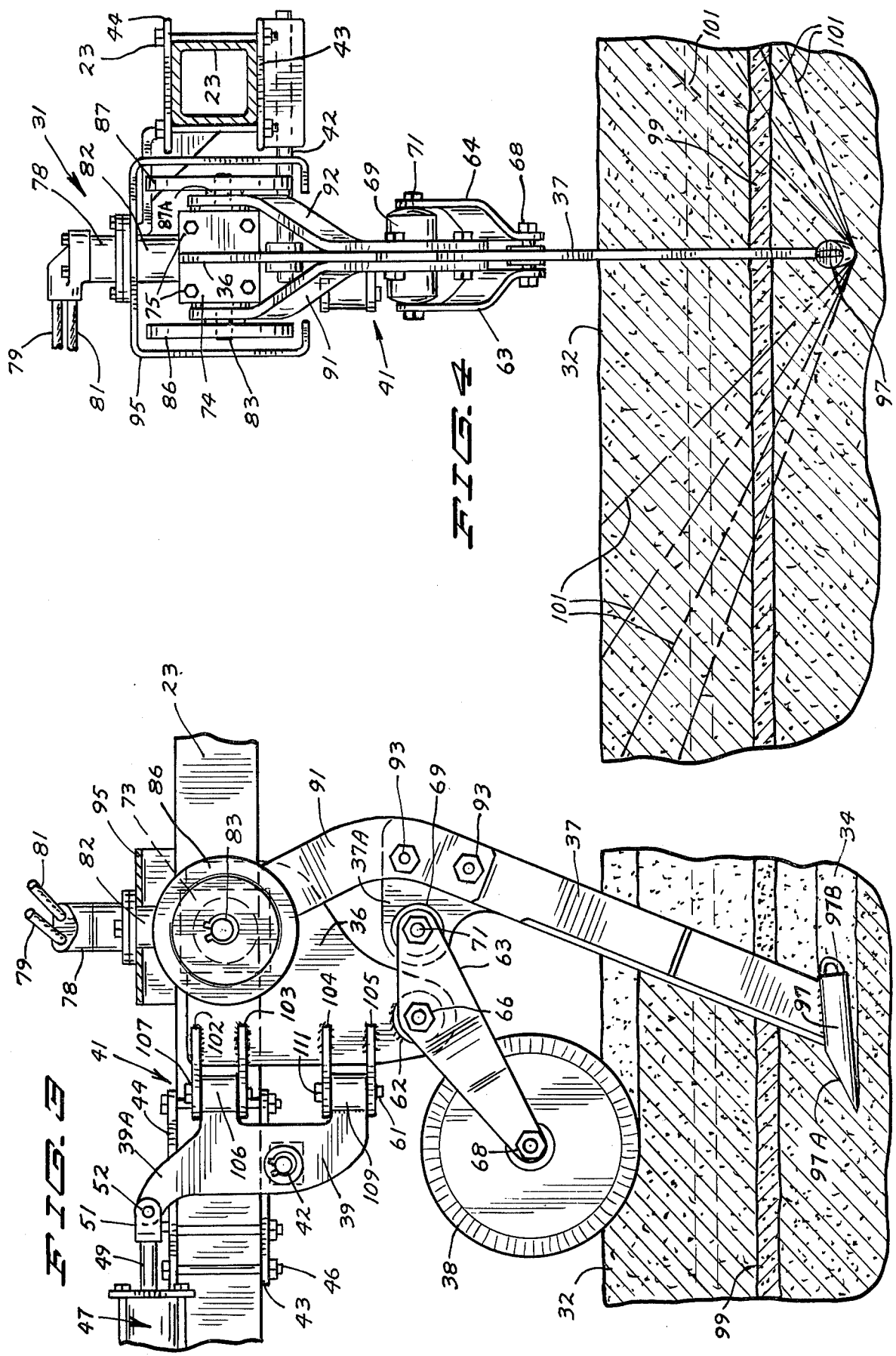

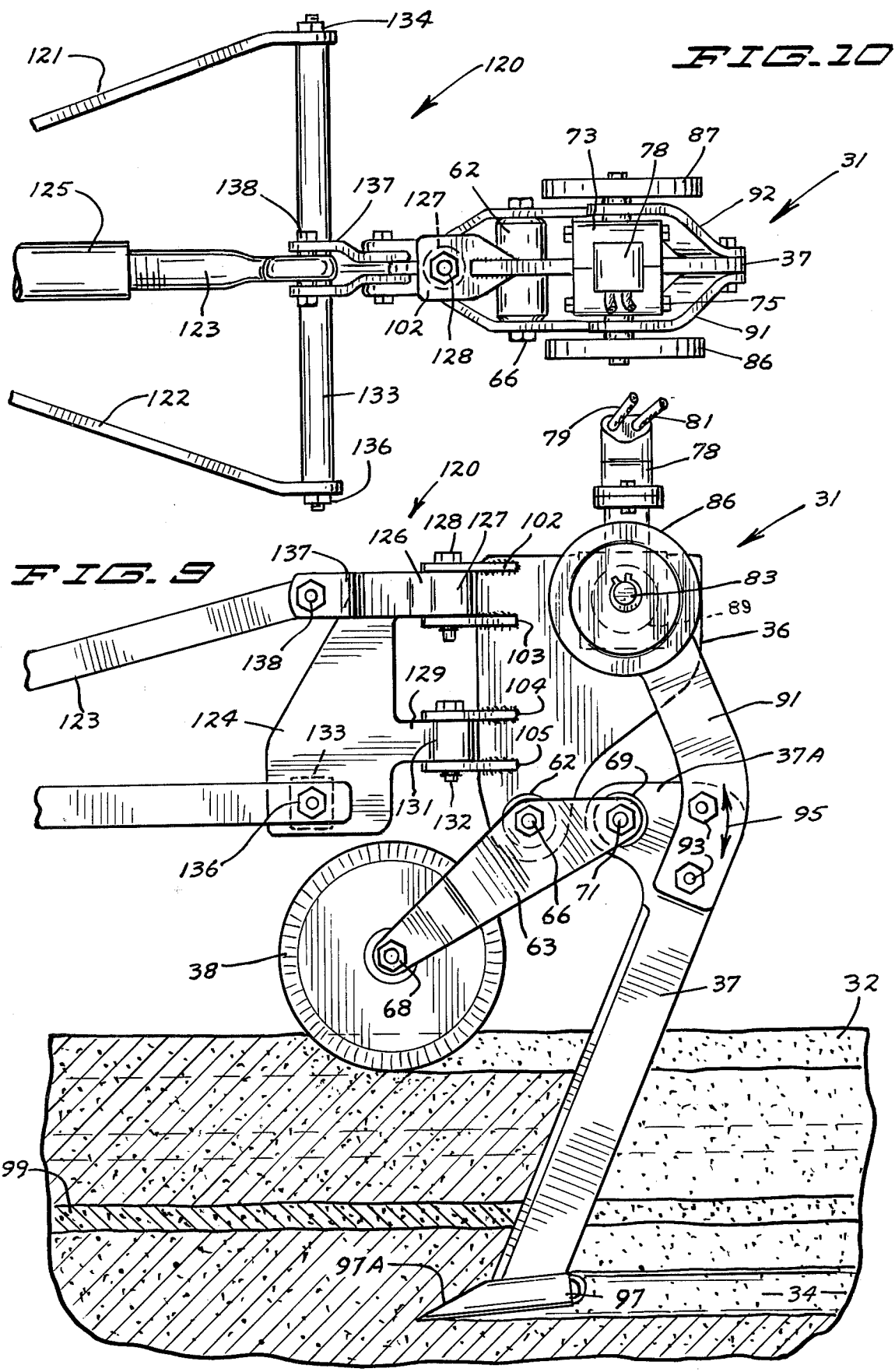

SUBSOILER

BACKGROUND OF THE INVENTION:

The use of heavy agricultural equipment and tractors and the continuous moldboard plowing of agricultural soil at the same depth creates plow sole or hardpan immediately below the normal plowing depth. The hardpan forms a barrier which hinders the penetration and circulation of water into the ground and prevents tap roots of plants to grow downwardly into the soil where they can utilize the subsoil nutrients and moisture. When the surface of the ground is wet, excessive moisture becomes run-off water and is lost because hardpan prevents the water from percolating into the subsoil.

Deep tillage implements have been developed to penetrate and break up the hardpan so that the soil is open, allowing moisture and roots to go down into the subsoil. The implements have a plurality of downwardly directed tools mounted on a tool bar. The tool bar is connected to a hitch of a tractor. Examples of tool bar deep tillage implements are shown in U.S. Pat. Nos. 3,352,598; 3,461,971 and 3,503,456. These subsoil working implements have stationary ground working tools and require large horsepower tractors to pull the tools through the soil. Cultivators having earthworking tools connected to a sonic energy unit have been used for breaking, turning and conditioning the soil. An example of the sonic earth cultivator machine is shown by Bodine in U.S. Pat. No. 3,231,025. Vibrator units mounted on tool bars have been used to vibrate ripper and chisel tools attached to the tool bars.

SUMMARY OF THE INVENTION

The invention is directed to a ground working implement having a plow or tool for working the subsoil. The implement has a means providing the tool with orbital movement which facilitates the breaking up of the subsoil and the movement of the tool through the soil. The tool is connected to a frame with hinge structure which includes a resilient and elastic means. The resilient and elastic means in cooperation with the structure for applying reciprocating movement to the tool causes the lower end of the tool to have a diminished orbital movement in response to the load applied to the tool. In an alternate structure, the resilient and elastic members are replaced with solid members whereby the tool has a fixed orbital movement or a fixed circular movement.

The implement is mounted on a draft beam of a tillage implement, as a moldboard plow, whereby the ground working tool breaks up the hardpan and subsoil in front of the moldboard plow bottoms. This facilitates the turning of the soil by the moldboard plow bottoms in addition to breaking up the hardpan. The implement has a frame connected to a carriage with a hinge assembly allowing the tool and frame to move about an upright axis. A biasing means connected to the carriage yieldably holds the tool in its normal ground working position. In the event that the tool strikes an obstruction, the tool can move rearwardly and upwardly until it rides over the obstruction against a biasing force of the biasing means which is sufficient to return the tool to its normal ground working position once the tool has cleared the obstruction.

Orbital movement is provided to the tool by a power transmission unit driving a pair of inertia wheels. The inertia wheels have eccentric hubs which are connected to connector structure attached to the tool. A hydraulic motor drives the power transmission unit. The rotating inertia wheels through the hubs on the wheels provide the tool with its orbital movement.

An object of the invention is to provide an implement with an orbitally moving tool operable to work the subsoil of an agricultural field. A further object of the invention is to provide a subsoiling implement in combination with a tillage implement, as a moldboard plow, operable to work the subsoil in front of the moldboard plow and facilitate the turning of the soil by the plow bottoms of the moldboard plow. A further object of the invention is to provide a subsoil implement with resilient and elastic means which cooperate with structure for applying orbital movement to the ground working tool to alter the amount of orbital movement of the tool in relation to the load applied to the tool. Yet another object of the invention is to provide a subsoiling implement with hinge assembly which allows the implement to be selectively mounted on a hitch unit connectable to a three-point hitch of a draft vehicle or to a carriage structure that can be mounted on the draft beam of a moldboard plow. Still another object of the invention is to provide a subsoiling tool with an orbital movement with the use of inertia wheels having eccentric hubs driven by a power transmission unit. Still a further object of the invention is to provide a subsoiling instrument having an orbital moving ground working tool that is sturdy in construction, versatile in use, and has a long operating life.

IN THE DRAWINGS

FIG. 2 is an enlarged perspective view of the implement of FIG. 1 attached to the draft beam of the plow;

FIG. 3 is a side elevational view partly sectioned of the implement of FIG. 2;

FIG. 4 is a rear elevational view of FIG. 3;

FIG. 7 is a diagram of the no-load orbital movement of the shoe of the tool;

FIG. 8 is a diagram of the orbital movement of the shoe of the tool under heavy load;

FIG. 9 is a side elevational view of the implement of FIG. 3 coupled to a hitch assembly mounted on the three-point hitch of a draft vehicle; and FIG. 10 is a top plan view of FIG. 9.

DESCRIPTION OF PREFERRED EMBODIMENTS

Figure 1:
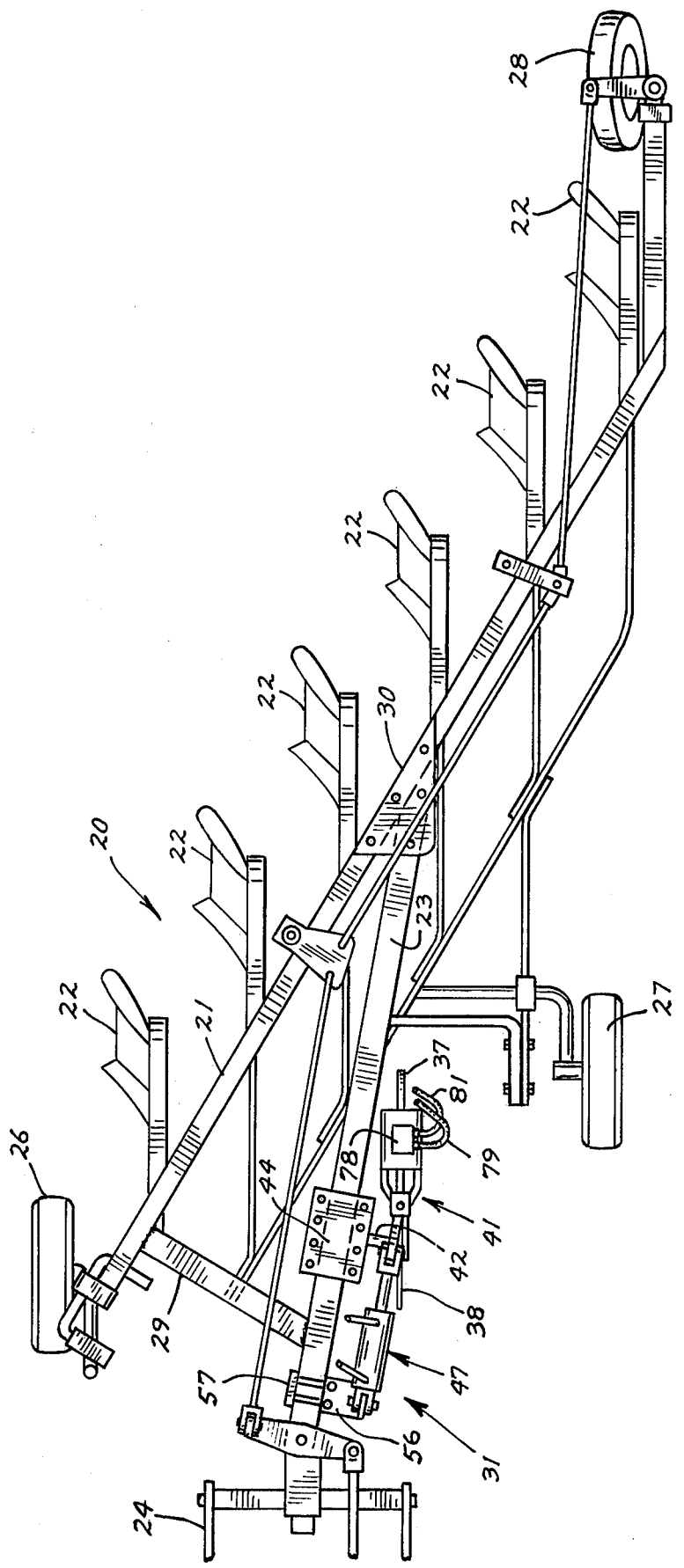
FIG. 1 is a top plan view of a moldboard plow carrying an implement to work the subsoil.

Referring to FIG. 1, a moldboard plow indicated generally at 20 has a main diagonal beam 21. A plurality of plow bottoms 22 are attached to beam 21 with conventional frame and trip structures. Plow 20 has a forwardly directed draft beam or tongue 23 having a forward end connected to a hitch 24. The rear end of draft beam 23 is connected with plate structure 30 to the midportion of beam 21. Plow 20 is supported on the ground with a front furrow wheel 26 and front land wheel 27 and a rear tail wheel 28. A cross brace 29 is secured to the forward end of beams 21 and 23. Examples of moldboard plows having beam structures and a plurality of plow bottoms are shown by Thompson et al in U.S. Pat. No. 3,559,745; Ward in U.S. Pat. No. 3,965,989; and Quanbeck in U.S. Pat. No. 3,550,690.

A ground working implement or subsoiler indicated generally at 31 is attached to the draft beam 23. Subsoiler 31 has a downwardly directed ground working tool or plow 37 located about midway between the first or forward plow bottom and the rear or trailing plow bottom. Referring to FIG. 2, subsoiler 31 functions to penetrate the ground 32 to form an elongated linear slit trench 33 leading to an underground passage or tunnel 34. Passage 34 facilitates the drainage of water to the conventional drain tiles in the ground. Tool 37 penetrates the ground and extends below the hardpan or compaction layer. An orbital movement is applied to tool 37 as it is pulled through the ground. The orbital movement of tool 37 breaks up the soil and facilitates the movement of the tool through the ground.

Subsoiler 31 has a body or main frame 36 carrying the downwardly directed ground working tool or plow 37. A rolling coulter or disc 38 is located in front of tool 37. Disc 38 functions to open or slice the top surface of the ground 32 and cut any trash or sod on the ground and near the surface of the ground to minimize the collection of this material on tool 37. Disc 38 can be a smooth or serrated disc.

Figure 5:
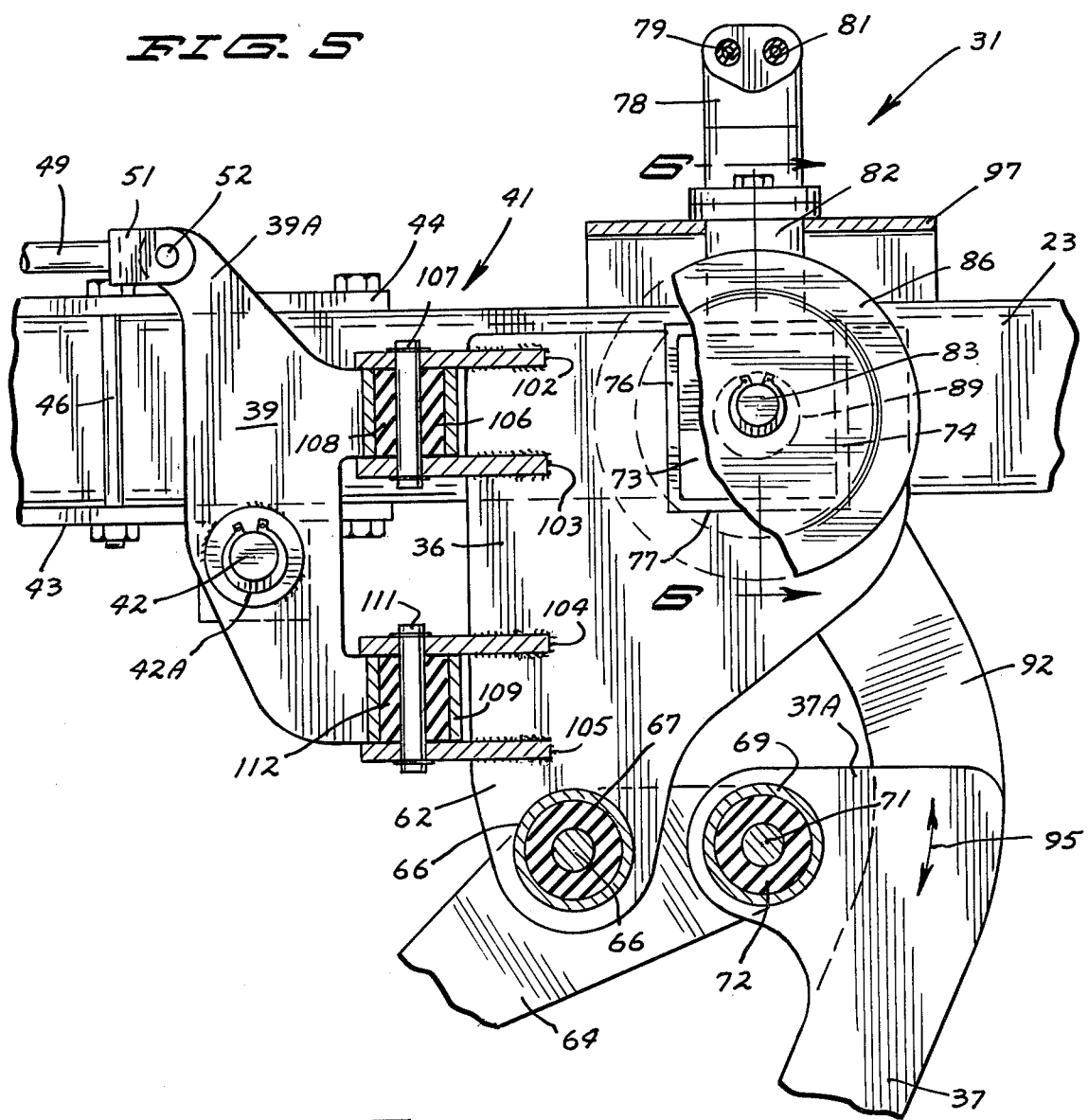
FIG. 5 is an enlarged sectional view taken along the line 5—5 of FIG. 2.

Body 36 is connected to a carrier or support member 39 with a coupling means or hinge assembly 41. Hinge assembly 41 allows the body 36 to pivot about a generally upright axis to facilitate turning of plow 20. The details of hinge assembly 41 are shown in FIG. 5 and are hereinafter described in detail. Carrier 39 is pivotally mounted on a transverse horizontal axle or rod 42. Axle 42 is secured by welds to a lower plate 43. An upper plate 44 is located over plate 43 and bears against the top of beam 23. Plates 43 and 44 are clamped to the draft beam 23 with a plurality of nut and bolt assemblies 46.

Returning to FIG. 2, a continuous biasing means shown as a hydraulic cylinder indicated generally at 47 having a cylinder 48 and a piston rod 49 functions to continuously bias the carrier 39 to yieldably hold tool 37 and disc 38 in their normal ground working positions. A U-shaped clevis 51 attached to the end of piston rod 49 extends adjacent opposite sides of an upwardly directed arm 39A of carrier 39. A pin 52 pivotally connects clevis 51 to arm 39A. The cylinder 48 has a pair of ears 53 accommodating a pin 54. The pin 54 extends through the hole in a bracket 56 mounted on beam 23. A plate 57 and a plurality of nuts and bolt assemblies 58 clamp the bracket 56 to draft beam 23.

Hydraulic cylinder 47 is connected to a suitable source of hydraulic pressure such as an accumulator or the hydraulic system of the draft vehicle. Cylinder 47 provides a resilient cushion or spring action which permits the carrier 39 to pivot in a counterclockwise direction as shown by arrow 59 when the tool 37 encounters a fixed or hard object such as a rock or similar obstruction in the ground. Cylinder 47 permits the tool to pivot in a rearward or counterclockwise direction so it can ride over the obstruction.

As shown in FIGS. 2, 3 and 5, body 36 has a downwardly directed projection or section 61 carrying a transverse sleeve 62. Sleeve 62 extends through a hole in section 62 and is welded to the section. A pair of links 63 and 64 are located adjacent opposite ends of sleeve 62 and are pivotally mounted on a bolt or pivot pin 66 extending axially through sleeve 62. As shown in FIG. 5, bolt 66 extends through a cylindrical elastic bushing 67 which resiliently mounts the bolt 66 in sleeve 62. The forward ends of links 63 and 64 are attached to a transverse axle 68 rotatably carrying disc 38.

Tool 37 has a forwardly directed upper end 37A extended between the rear portions of the links 63 and 64. A transverse sleeve 69 secured to end 37A with welds accommodates a transverse pin or bolt 71 connected to links 63 and 64. An elastic or resilient cylindrical bushing 72 surrounds bolt 71 and mounts the bolt in sleeve 69.

The power is transmitted to the tool 37 through a gear box or power transmission unit 73. As shown in FIG. 5, power transmission unit 73 is located in a generally square space formed by upright plates 74 and 76 and horizontal plate 77 secured to the upper portion of main frame 36. A plurality of bolts 75, shown in FIG. 4, attach power transmission unit 73 to plates 74, 76 and 77.

Power is supplied to power transmission unit 73 with a hydraulic motor 78. A pair of hydraulic lines or hoses 79 and 81 connect motor 78 to a source of hydraulic fluid under pressure which provides motor 78 with operating hydraulic fluid. Motor 78 is mounted on a casing 82 extended upwardly from power transmission unit 73.

Figure 6:
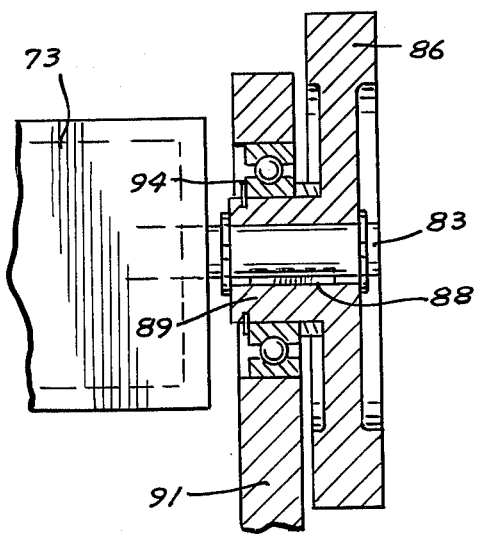
FIG. 6 is an enlarged sectional view taken along the line 6—6 of FIG. 5.

Power transmission unit 73 has horizontal outwardly directed output shafts 83 and 84. A pair of flywheels or inertia wheels 86 and 87 are mounted on shafts 83 and 84 respectively and rotate with the shafts. As shown in FIG. 6, a key 88 fixes the flywheel 86 to shaft 83. Flywheel 86 has an inwardly directed eccentric hub 89. Hub 89 has an outer cylindrical surface that is eccentric or off-center from the center axis of shaft 83. For example, the eccentricity of the hub 89 is ⅜ inch or 1 cm. thereby providing a ¾ inch or 2 cm. throw. Other offsets can be used for hub 89. The flywheel 87 has a similar eccentric hub 87A located in circumferential and eccentric alignment with hub 89.

As shown in FIG. 4, a pair of upwardly directed connector plates 91 and 92 connect the hubs 87A and 89 with the upper end of the tool 39. Shear pins and bolts 93 secure the lower ends of the plates 91 and 92 to the upper end of tool 37. The upper ends of the plates 91 and 92 have holes accommodating bearings 94. Bearings 94 are mounted on the hubs 87A and 89, as shown in FIG. 6. A generally U-shaped shield or cover 95 is positioned over the flywheels 86 and 87 and power transmission unit 73.

A cylindrical member or shoe 97 is secured to the lower end of tool 37. Shoe 97 has a forwardly and downwardly inclined upper face 97A extended in front of the tool 37. As shown in FIG. 3, shoe 97 is angularly positioned in a forward and downward direction with respect to the horizontal plane. A loop 97B is connected to the rear of shoe 97. A cable (not shown) attached to loop 97B is used to pull a line or tubular tile along passage 34.

On the operation of power transmission unit 73, the flywheels 86 and 87 rotate to thereby move the connecting plates 91 and 92 in an eccentric path. The upper end of tool 37 reciprocates about the axis of pin 66 in an up-and-down direction, as shown by the arrow 96. Shoe 97 moves in an upwardly and forwardly inclined orbital path, as illustrated by the diagram 98A in FIG. 7. The orbital path of shoe 97 is an endless path that varies in accordance with the load applied to the tool 37 and shoe 97. When tool 37 or shoe 97 is subjected to heavy load, the orbital path is reduced and forms a circularlike endless path as shown by the diagram 98B in FIG. 8.

Referring to FIG. 4, agricultural soil or ground 32 is shown as having a hardpan or compaction layer 99. The layer 99 can result from a number of conditions including equipment and tractor compaction. The normal depth of the layer is between 14 and 16 inches, 35.5 to 40.5 cm., below the surface of the ground. This depth is below the normal moldboard plow working depths of 8 to 10 inches, 20.5 to 25.5 cm. Tool 37 penetrates the ground to a depth below the layer 99. For example, the shoe 97 can penetrate to a depth of 24 inches, 61 cm., or more below the surface. The continuous endless path or orbital movement of shoe 97 produces radially and upwardly directed stress or fracture forces which break up the holding or bonding forces of the soil including the hard layer 99. This facilitates the absorption and retention of water by the soil and permits the plant tap roots to penetrate into the subsoil.

Referring to FIG. 5, hinge assembly 41 includes a first pair of horizontal plates or members 102 and 103 and a second pair of horizontal plates or members 104 and 105 secured to the forward portion of main frame 36. An upright sleeve 106 is secured to the carrier 39 and is located between the members 102 and 103. A second upright sleeve 109 is secured to the lower part of carrier 39 and is located between the members 104 and 105. A first pin 107 extends between aligned holes in the members 102 and 103 through sleeve 106. A cylindrical elastic bushing 108 surrounds pin 107 and is located within sleeve 106. A second pin 111 in vertical alignment with pin 107 extends through aligned holes in members 104 and 105 and through the sleeve 109. A second cylindrical elastic bushing 112 mounts pin 111 in sleeve 109. The bushings 108 and 112 are annular resilient and elastic members which insulate the carrier 39 from the oscillating and vibratory movements of main frame 36 caused by the eccentric hubs of the flywheels 86 and 87 and the moving tool 37.

Referring to FIGS. 9 and 10, there is shown the implement 31 mounted on a hitch assembly indicated generally at 120. Hitch assembly 120 is carried by the conventional draft links 121 and 122 and a control link 123 of a three-point hitch on a draft vehicle or tractor. The three-point hitch is commonly found on agricultural and industrial tractors.

Hitch assembly 120 has an upright center plate 124 provided with a first rearwardly directed upper ear 126. An upright sleeve 127 is secured to ear 126 and is located between the hinge members 102 and 103 and sleeve 127. A first cylindrical elastic bushing is located within sleeve 127 and resiliently mounts the bolt 128 in sleeve 127. Plate 124 has a second or lower rearwardly directed ear 129 attached to an upwardly directed sleeve or collar 131. Sleeve 131 is located between the hinge members 104 and 105. An upright bolt 132 in axial alignment with the bolt 128 extends through the hinge members 104 and 105 and the sleeve 131. A second elastic cylindrical bushing located within sleeve 131 mounts the bolt 132 on the sleeve 131. The elastic bushings in sleeves 127 and 131 are identical with the bushings 108 and 112 as shown in FIG. 5. The bolts 128 and 132 form part of the coupling means or hinge assembly which permits the implement to pivot about a generally upright axis with respect to the center plate 124.

A heavy cross bar or drawbar 133 is secured to the lower end of plate 124. Bar 133 has opposite ends 134 and 136 attached to the ends of draft links 121 and 122. Nuts can be threaded onto the ends 134 and 136 to mount the bar 133 on the draft links 121 and 122. Removable pins extended through the ends of bar 133 can be used to hold the draft links in assembled relation with the draft links 121 and 122.

The upper end of center plate 124 carries a U-shaped yoke or clevis 137 having bifurcated members with transverse aligned holes for accommodating a pin 138. An end of control link 133 is provided with a hole to receive pin 138 whereby the control link 133 is pivotally mounted on the clevis 137. Control link 123 includes an adjustable sleeve 125 operable to pivot the implement 31 about the bar 133 and thereby the attitude or upright position of tool 37. Control sleeve 125 can be a double-acting hydraulic cylinder.

In use, implement 31 attached to the plow draft beam 23 penetrates the soil to a depth below compaction layer 99. The hydraulic motor 78 drives the gear box between 1,000 and 1,400 rpm. The eccentric hubs 89 and 87A on the flywheels 86 and 87 are in circumferential and eccentric alignment with each other so that connecting plates 91 and 92 reciprocate in unison to move the tool 37 in its orbital path in the vertical plane of the tool. The forward end 97A of the shoe 97 is in general vertical alignment with the hinge assembly 41 axis formed by the bolts 107 and 111. The resilient elastic bushings surrounding the bolts 107 and 111 are annular energy-receiving-and-storing members which function in conjunction with the eccentric motion caused by flywheels 86 and 87 to vary the orbital movement of the tool 37 in accordance with the load on the tool. When the load increases the orbital movement decreases and and approaches a circular motion as shown by the diagram 98B in FIG. 8. When the tool 37 is under no load or light load, the orbital movement of the shoe 97 will be an elongated elliptical orbital movement along the generally upward and forwardly directed major axis as shown by the movement path 98A in FIG. 7.

The orbital movement of the tool 37 and shoe 97 causes the vibrating and shock forces to be transmitted through the soil. These forces break up the hard compaction layer 99 in front of the tool 37 as well as to the opposite sides of the tool. Applicant has found that when the shoe 97 is at a depth of about 60 cm. the shock forces have a lateral range of up to 150 cm. on each side of the tool 37. About 120 cm. of the compaction layer is directly affected and loosened by the oscillatory movement of the tool 37 and shoe 97. The effective range of the tool 37 is dependent upon the depth of the tool, soil conditions, and the depth and hardness of the compaction layer 99. Other factors, such as moisture content and surface vegetation, also have a effect on the operation of tool 37 and shoe 97 to break up the compaction layer 99. The soil above the compaction layer is also affected by the tool 37. The adhesive forces holding the soil particles together are broken down and thereby facilitate the turning of the soil by the plow bottoms 22.

When the tool 37 or shoe 197 strikes an object such as a rock or bedrock, carrier 39 will pivot about the axle 42 in the direction of the arrow 59 as shown in FIG. 2. The pivotal movement is against the biasing force of the hydraulic cylinder 47. Hydraulic cylinder 47 provides a resilient cushion which allows the tool 37 to move rearwardly and upwardly so that it can ride up over the object. As soon as the tool 37 passes over the object, the force of the hydraulic fluid in the cylinder 47 will return the tool 37 to its normal ground working position.

Implement 31, as shown in FIGS. 9 and 10, is mounted directly on the three-point hitch of a draft vehicle such as a tractor. The hitch assembly 121 has part of the hinge assembly which permits the frame 36 and tool 37 of implement 31 to pivot about a generally upright axis. This allows the tractor to make relatively sharp turns without placing an extreme lateral or side force on tool 37. The depth of tool 37 is controlled by the position of the control link 123 and the draft links 121 and 122. The coulter 38 cuts a slit in the top surface of the soil which facilitates the movement of the tool 37 through the soil and minimizes the collection of trash and crop residue on the upper end of tool 37. The orbital movement of the tool 37 and shoe 97 is identical with the subsoiler 31 shown in FIGS. 1–8.

The tool or plow 37 can be provided with a fixed orbital movement as illustrated by the diagram 98A in FIG. 7. This is accomplished by replacing the elastic sleeves 108 and 112 with solid bearing members. The movement caused by the eccentric hubs 87A and 89 on the flywheels 86 and 87 are transmitted via the conductor plates 91 and 92 to the tool 37. This movement is fixed since the fixed members in the hinge assembly do not absorb and store energy. All of the moving energy is transmitted to the plow 37 thereby providing the shoe 97 with a constant or fixed orbital movement. Plow 37 can be connected to links 63 and 64 in a manner to allow shoe 97 to move in an endless constant or fixed circular path.

Moldboard plow 20 is one form of an earthworking or tillage implement. Other types of tillage implements can be used in combination with subsoiler 31. Examples of other tillage implements are chisel plows, harrows, row crop and field cultivators and disc plows. These examples are not intended to limit the type of tillage implement that can be used with subsoiler 31.

While there has been shown and described a preferred embodiment of the implement to work the subsoil and the combination of the implement with a moldboard plow and a hitch assembly for a three-point hitch, it is understood that changes in the structure, structural relationship, materials and parts may be made by those skilled in the art without departing from the invention. The invention is defined in the following claims.

The embodiments of the invention in which an exclusive property or privilege is claimed are defined as follows:

1. In combination: a tillage implement having at least one ground working tool and a beam, and means for working the subsoil attached to the beam, said means having a ground working tool adapted to extend into the subsoil and means for moving the tool in a path whereby the tool breaks up the subsoil, said means for working the subsoil includes a frame, means connecting the frame to the beam, link means pivotally connecting the tool to the frame, said means for moving the tool being mounted on the frame and providing eccentric movement, connector means attached to the tool and cooperating with said means for providing eccentric movement to move the tool in an orbital path, and a coulter rotatably mounted on the link means, said coulter being located forwardly of and in longitudinal alignment with the tool.

2. The structure of claim 1 including: elastic means mounting the link means on the frame.

3. The structure of claim 1 wherein: the means for providing eccentric movement includes a power transmission unit having drive shafts, means to provide power to the power transmission unit to rotate the drive shafts, flywheels secured to the drive shafts, each flywheel having an eccentric hub, said connector means being mounted on the eccentric hubs whereby on rotation of the flywheels the connector means operate to move the tool in the orbital path.

4. The structure of claim 1 wherein: the means connecting the frame to the beam includes a carriage, pivot means pivotally connecting the carriage to the beam, and means to bias the carriage to a position to hold the tool in its normal ground working position.

5. The structure of claim 4 including: a hinge assembly pivotally connecting the carriage with the frame whereby the frame pivots about a generally upright axis.

6. The structure of claim 5 wherein: the hinge assembly includes elastic means separating the frame from the carriage.

7. The structure of claim 1 wherein: the means connecting the frame to the beam includes a hinge assembly allowing the frame to pivot about a generally upright axis.

8. The structure of claim 7 wherein: the hinge assembly includes eleastic means separating the frame from the beam.

9. The structure of claim 1 wherein: the tillage implement is a moldboard plow having a plurality of plow bottoms, a main beam and a forwardly extended draft beam, said means for working the subsoil being attached to the draft beam.

10. The structure of claim 1 wherein: said ground working tool is an elongated generally flat member having a lower end, a cylindrical shoe secured to the lower end of the member.

11. In combination: a tillage implement having at least one ground working tool and a beam, and means for working the subsoil attached to the beam, said means having a ground working tool adopted to extend into the subsoil, means for moving the tool in an orbital path whereby the tool breaks up the subsoil, a frame, means connecting the tool to the frame, said means for moving the tool in an orbital path includes a power transmission unit having a drive shaft, means for providing power to the power transmission unit to rotate the drive shaft, a flywheel secured to the drive shaft, said flywheel having an eccentric hub, means mounted on the hub and connected to the tool whereby upon rotation of the flywheel the tool moves in the orbital path.

12. The structure of claim 11 wherein: the means to provide the power to the power transmission unit comprises a hydraulic motor.

13. The structure of claim 14 including: elastic means mounting the frame to the beam.

14. The structure of claim 14 including: link means pivotally connecting the tool to the frame and elastic means mounting the link means on the frame.

15. An apparatus for working subsoil comprising: a frame, an earthworking tool adapted to extend into the subsoil in a normal ground working position, link means pivotally connecting the tool to the frame, means mounted on the frame for providing eccentric movement, and connector means attached to the tool and cooperating with the means for providing eccentric movement to move the tool in an endless path and a coulter rotatably mounted on the link means, said coulter being located forwardly of and in longitudinal alignment with the tool.

16. The structure of claim 15 including: elastic means mounting the link means on the frame.

17. The structure of claim 15 wherein: the means mounted on the frame for providing eccentric movement includes inertia wheel means, eccentric means connected to the wheel means providing the connector means with motion in response to rotation of the wheel means, and means for rotating the inertia wheel means.

18. The structure of claim 17 wherein: the means for rotating the inertia wheel means includes a power transmission unit having a drive shaft, said wheel means being mounted on the drive shaft, and means to rotate the drive shaft.

19. The structure of claim 17 wherein: the inertia wheel means comprises a pair of flywheels, and the means for rotating the wheel means includes a power transmission unit having a pair of drive shafts, having a flywheel mounted on each drive shaft, and means to rotate the drive shafts.

20. The structure of claim 15 including: first elastic means mounting the frame to a support, and second elastic means mounting the link means on the frame.

21. The structure of claim 15 including: a hinge assembly pivotally connected to the frame allowing the frame to move about a generally upright axis.

22. The structure of claim 21 wherein: the hinge assembly includes elastic means providing an energy receiving and dissipating structure controlling the amplitude of the orbital path of the tool in response to the load applied to the tool.

23. An apparatus for working subsoil comprising: a frame, an earth-working tool adapted to extend into the subsoil in a normal ground working position, link means pivotally connecting the tool to the frame, means mounted on the frame for providing eccentric movement, and connector means attached to the tool and cooperating with the means for providing eccentric movement to move the tool in an endless path and a coulter rotatably mounted on the link means, said coulter being located forwardly of and in longitudinal alignment with the tool, said means for providing eccentric movement includes a gear box having drive shafts, means to provide power to the gear box to rotate the drive shafts, flywheels secured to the drive shafts, each flywheel having an eccentric hub, said connector means being rotatably mounted on the eccentric hubs whereby on rotation of the flywheels the connector means operate to move the tool in the orbital path.

24. The structure of claim 23 wherein: the means to provide power to the gear box comprises a hydraulic motor mounted on the gear box.

25. The structure of claim 23 including: a carriage, pivot means adapted to pivotally connect the carriage to a support, and means to bias the carriage to a position to hold the tool in its normal ground working position.

26. The structure of claim 25 including: a hinge assembly pivotally connecting the carriage with the frame whereby the frame pivots about a generally upright axis.

27. The structure of claim 26 wherein: the hinge assembly includes elastic means separating the frame from the carriage.

28. The structure of claim 23 wherein: said tool is an elongated generally flat member having a lower end, a cylindrical shoe secured to the lower end of the flat member.

29. An apparatus for working subsoil comprising: a frame, an earth-working tool adapted to extend into the subsoil in a normal ground working position, link means pivotally connecting the tool to the frame, means mounted on the frame for providing eccentric movement, and connector means attached to the tool and cooperating with the means for providing eccentric movement to move the tool in an endless path and a coulter rotatably mounted on the link means, said coulter being located forwardly of and in longitudinal alignment with the tool, said means mounted on the frame for providing eccentric movement includes inertia wheel means, eccentric means connected to the wheel means providing the connector means with motion in response to rotation of the wheel means, and means for rotating the inertia wheel means, said eccentric means is a hub on the wheel means, and means rotatably mounting the connector means on the hub.

30. An apparatus for working subsoil comprising: a frame, an earthworking tool adapted to extend into the subsoil in a normal ground working position, link means pivotally connecting the tool to the frame, means mounted on the frame for providing eccentric movement, and connector means attached to the tool and cooperating with the means for providing eccentric movement to move the tool in an endless path and a coulter rotatably mounted on the link means, said coulter being located forwardly of and in longitudinal alignment with the tool, said means mounted on the frame for providing eccentric movement includes inertia wheel means, eccentric means connected to the wheel means providing the connector means with motion in response to rotation of the wheel means, and means for rotating the inertia wheel means, said inertia wheel means comprises a pair of flywheels, and the means for rotating the wheel means includes a power transmission unit having a pair of drive shafts, having a flywheel mounted on each drive shaft, and means to rotate the drive shafts, said eccentric means comprises an eccentric hub secured to each flywheel, and means rotatably mounting the connector on each hub.

31. An apparatus for working subsoil comprising: a frame, a hitch assembly adapted to be mounted on a hitch of a draft vehicle, coupling means connecting the frame to the hitch assembly, a tool adapted to extend into the subsoil, means connecting the tool to the frame, said means connecting the tool to the frame including link means pivotally connected to the tool and frame, means for moving the tool in an endless path, and a coulter rotatably mounted on the link means, said coulter being located forwardly of and in longitudinal alignment with the tool.

32. The apparatus of claim 31 wherein: the hitch assembly has an upright member adapted to be connected to a control link of a three-point hitch and a cross bar connected to the upright member, said cross bar having end portions adapted to be mounted on the draft links of a three-point hitch, said coupling means being attached to the upright member.

33. The apparatus of claim 32 wherein: the coupling means is a hinge assembly allowing the frame to move about a generally upright axis.

34. The apparatus of claim 33 wherein: the hinge assembly has elastic means resiliently separating the frame from the upright member.

35. The apparatus of claim 31 wherein: the coupling means is a hinge assembly allowing the frame to move about a generally upright axis.

36. The apparatus of claim 35 wherein: the hinge assembly has elastic means resiliently separating the frame from the upright member.

37. The apparatus of claim 31 wherein: the means for moving the tool includes a power transmission unit having a drive shaft, means to provide power to the power transmission unit to rotate the drive shaft, a flywheel mounted on the drive shaft, a rotatable eccentric member connected to the flywheel and rotatable therewith, and means connecting the eccentric member with a tool whereby on rotation of the flywheel and eccentric member the tool has orbital movement.

38. An apparatus for working subsoil comprising: a frame, a hitch assembly adapted to be mounted on a hitch of a draft vehicle, coupling means connecting the frame to the hitch assembly, a tool adapted to extend into the subsoil, means connecting the tool to the frame, and means for moving the tool in an endless path, said means for moving the tool in an endless path including a power transmission unit having a drive shaft, means for providing power to the power transmission unit to rotate the drive shaft, a flywheel secured to the drive shaft, said flywheel having an eccentric hub, means mounted on the hub and connected to the tool whereby upon rotation of the flywheel the tool moves in the endless path.

39. The apparatus of claim 38 wherein: the means to provide power to the power transmission unit comprises a hydraulic motor.

40. The apparatus of claim 38 including: link means pivotally connecting the tool to the frame, and elastic means mounting the link means on the frame.

41. The apparatus of claim 40 including: a coulter rotatably mounted on the link means, said coulter being located forwardly of and in longitudinal alignment with the tool.

42. The apparatus of claim 38 wherein: the power transmission unit includes a gear box having drive shafts, and a flywheel secured to each drive shaft, each flywheel having an eccentric hub, said means mounted on the hub comprising connector means being rotatably mounted on the hubs of each flywheel whereby on rotation of the flywheels the connector means operates to move the tool in an endless path.

43. The apparatus of claim 42 wherein: the means to provide power to the gear box comprises a hydraulic motor mounted on the gear box.

44. The apparatus of claim 38 wherein: the hitch assembly has an upright member adapted to be connected to a control link of a three-point hitch and a cross bar connected to the upright member, said cross bar having end portions adapted to be mounted on the draft links of a three-point hitch, said coupling means being attached to the upright member.

45. The apparatus of claim 44 wherein: the coupling means is a hinge assembly allowing the frame to move about a generally upright axis.

46. The apparatus of claim 45 wherein: the hinge assembly has elastic means resiliently separating the frame from the upright member.

47. The apparatus of claim 38 wherein: the coupling means is a hinge assembly allowing the frame to move about a generally upright axis.

48. The apparatus of claim 47 wherein: the hinge assembly has elastic means resiliently separating the frame from the upright member.

49. The apparatus of claim 38 wherein: the means connecting the tool of the frame includes link means pivotally connected to the tool and frame.

* * * * *

UNITED STATES PATENT AND TRADEMARK OFFICE
CERTIFICATE OF CORRECTION

PATENT NO. : 4,102,402
DATED : July 25, 1978
INVENTOR(S) : Richard W. Steinberg

It is certified that error appears in the above-identified patent and that said Letters Patent are hereby corrected as shown below:

Column 6, line 13, after "thereby" insert -- change --.

Column 6, line 32, after "decrease" remove "and" (first occurrence).

Column 8, line 53, cancel "14" and insert -- 11 --.

Column 8, line 55, cancel "14" and insert -- 11 --.

Signed and Sealed this

Sixteenth Day of January 1979

[SEAL]

Attest:

RUTH C. MASON
Attesting Officer

DONALD W. BANNER
Commissioner of Patents and Trademarks